Dec. 16, 1930.  W. R. HALL  1,784,870
ART OF GARAGE CONSTRUCTION
Filed Jan. 23, 1930  2 Sheets-Sheet 1
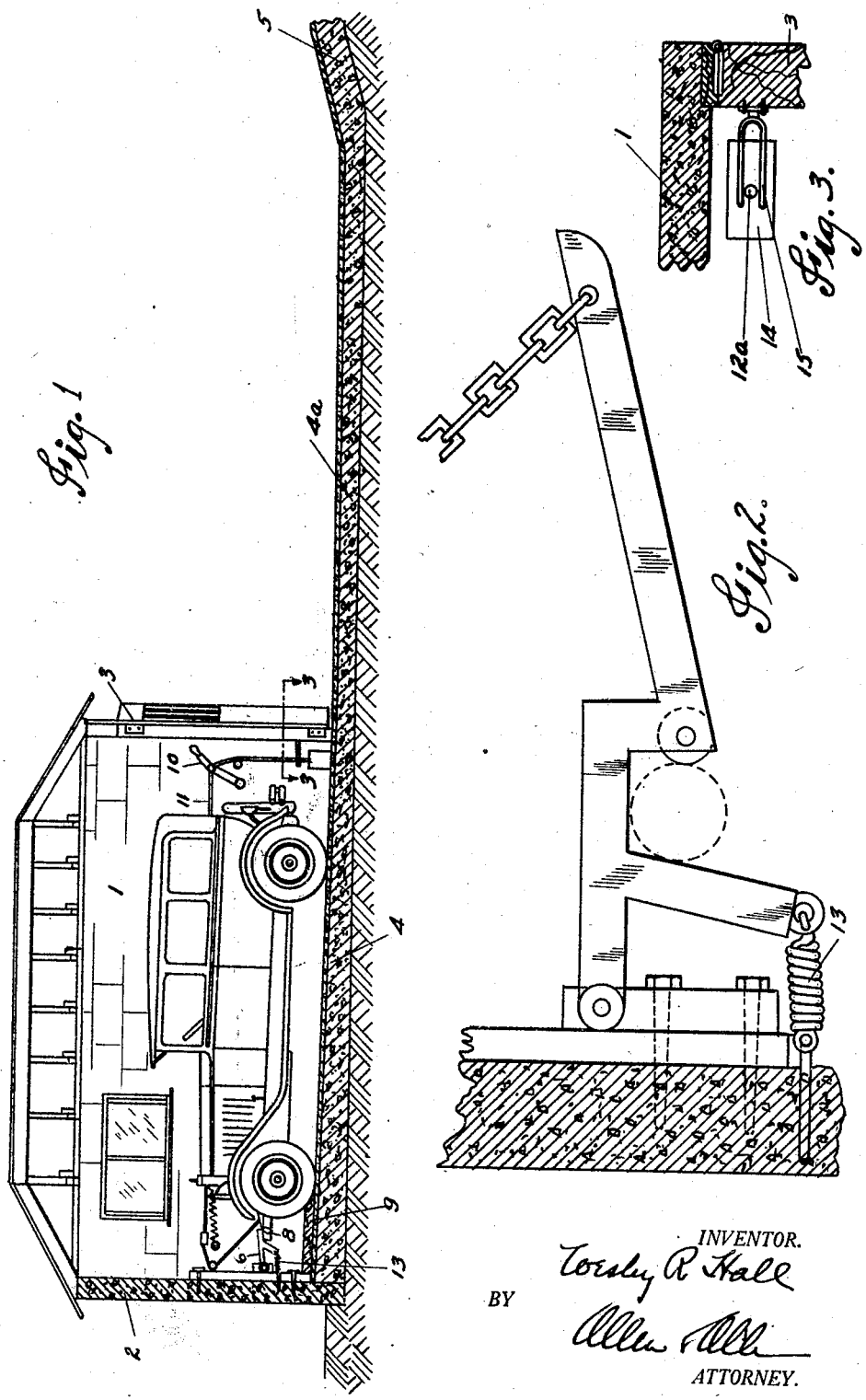
INVENTOR.
Torsley R Hall
BY
ATTORNEY.

Dec. 16, 1930.  W. R. HALL  1,784,870
ART OF GARAGE CONSTRUCTION
Filed Jan. 23, 1930  2 Sheets-Sheet 2

INVENTOR.
Wesley R Hall
BY
ATTORNEY.

Patented Dec. 16, 1930

1,784,870

UNITED STATES PATENT OFFICE

WESLEY R. HALL, OF CINCINNATI, OHIO

ART OF GARAGE CONSTRUCTION

Application filed January 23, 1930. Serial No. 422,887.

My invention relates to the art and system of garage construction which will tend to prevent asphyxiation of the driver during starting of the vehicle in a closed garage.

There is hardly a day that passes when one does not read in the newspaper of some fatal accident when some automobile driver has started up the motor of his car with the garage doors shut, and been asphyxiated by the carbon monoxide fumes generated from the cold motor. It is broadly the object of my invention to so construct a garage that asphyxiation of the driver will be impossible in the normal use of the car, providing that the driver does not deliberately try to thwart the safety features of the system.

The system which I have invented requires the construction of the garage so that when the automobile is put away it will be held by a suitable attaching device so that it cannot be removed until after the driver has opened the doors, or has had an opportunity of doing so, when the car will slowly roll back out of the garage to a suitable position outside the garage, where it encounters an upwardly inclined sloping surface which brings the car to a stop so that the driver may enter the car out-of-doors where no danger of asphyxiation will be likely.

The above objects and other objects to which reference will be made in the ensuing disclosure, I accomplish by that certain combination and arrangement of parts of which I have shown a preferred embodiment.

Referring to the drawings:—

Figure 1 is a diagrammatic sectional view showing my preferred system.

Figure 2 is an enlarged detail of the automobile locking system.

Figure 3 is a detail of a locking device which will prevent release of the car until after the garage door is opened.

Figure 4:
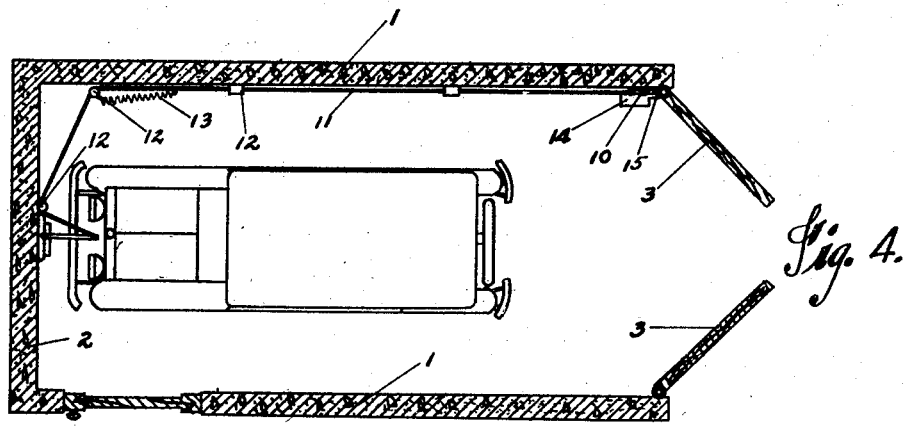
Figure 4 is a plan view of my garage construction.
Figure 5:
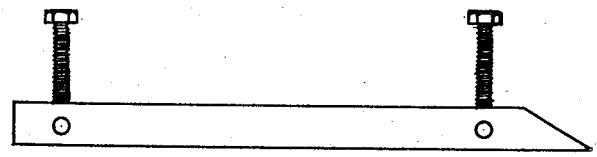
Figure 5 is a detail view of a tire bumper which may form part of my system.
Figure 6:
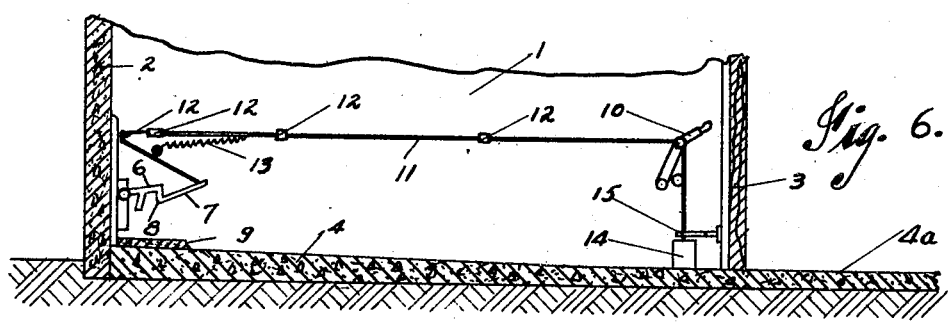
Figure 6 is a diagrammatic view showing the mechanism within the garage.

The garage is of the built-in-type with side walls 1, an end wall 2, and having doors 3, which, when closed, form of the garage space a substantially non-ventilated enclosure. The floor 4 of the garage is made to slope with a grade of about one-eighth inch per foot. Outside the garage, the roadway or surface 4a, over which the car rolls back, continues with about the same grade as the garage floor to a position indicated at 5 where an upwardly sloping surface is provided, which stops the backward rolling of the car. It is ordinarily at the position indicated at 5 that the driver enters the car.

Within the garage, pivotally mounted on the end wall, I have provided a latching device 6 having a cam shaped arm 7 which is elevated by the front bumper of the car until the bumper passes under the hook-shaped portion 8, in which position the latch drops down and securely holds the car in position with its front tires slightly elevated, due to the inclined blocks 9 which the tires engage shortly the bumper is engaged by the latch. The car is held with the front tires under slight compression so that an initial impetus will be given it to start to roll backward as soon as the latch is released.

For releasing the latch there is a lever 10 located near the closing doors, and cables 11 passing through pulleys 12 or guides, are secured to the latch so that the latch may be elevated to release the car. Springs 13 and a weight 15 may be used to facilitate the action of the system. As soon as the lever 10 is actuated it is returned to the set position so that when the bumper of the car again engages the latch, there will be enough gravity drop to the latch or slackness in the cable to enable it to again operate and drop over the bumper bar. As noted, the springs 13 will facilitate the operation.

As a preferred modification, I have shown a forked bar 15 moved by the door which locks the lever 10 from movement until such time as the doors are open by blocking the upward movement of the weight 14. When such a device is used, the operator of the car is physically unable to release his car until after the doors have been opened.

Figure 7:
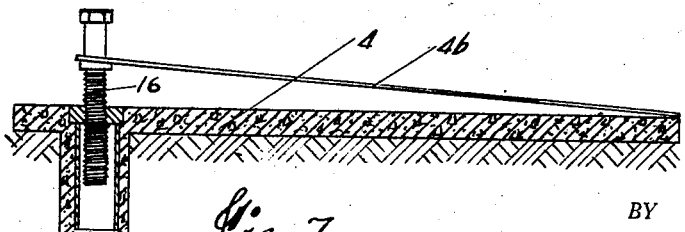
Figure 7 is a sectional view of a ramp which may be employed for use in garages in which the floor is level.

I have further shown in Figure 7 a mounting stud 16 by which ramps 4b may be set at a desired grade when the floor of the garage to be equipped with my novel system, is flat.

While other arrangements and locking devices may be employed with my system, its essential elements are an inclined floor over which the car will roll back with released brakes, a locking device for holding some part of the car which will prevent its operation, a releasing device at the doors of the garage, preferably inhibited until the doors are open, and an inclined surface so arranged outdoors as to block the backing movement of the car.

Having thus described my invention, what I claim as new and desire to secure by Letters Patent, is:—

1. In the art of garage construction, the provision of a supporting surface so inclined that the car, without brakes, will gently roll back over same, the provision of a locking device for holding the car to prevent its backward movement, a releasing device for said locking device located adjacent the car door, and an inclined surface located exteriorally of the car for blocking the movement of the car after its movement from the garage.

2. In the art of garage construction, the provision of a supporting surface so inclined that the car, without brakes, will gently roll back over same, the provision of a locking device for holding the car to prevent its backward movement, a releasing device for said locking device located adjacent the car door, and an inclined surface located exteriorally of the car for blocking the movement of the car after its movement from the garage, and an interlocking device on a door which will prevent operation of the release until after said door is opened.

3. In the art of garage construction, the provision of a supporting surface so inclined that the car, without brakes, will gently roll back over same, the provision of a locking device for holding the car to prevent its backward movement, a releasing device for said locking device located adjacent the car door, and an inclined surface located exteriorally of the car for blocking the movement of the car after its movement from the garage, said locking device effective on the bumper of an automobile.

4. In the art of garage construction, the provision of a supporting surface so inclined that the car, without brakes, will gently roll back over same, the provision of a locking device for holding the car to prevent its backward movement, a releasing device for said locking device located adjacent the car door, and an inclined surface located exteriorally of the car for blocking the movement of the car after its movement from the garage, said locking device effective on the bumper of an automobile, and the provision of means to impart an initial movement to the automobile when said release is actuated.

WESLEY R. HALL